J. G. P. EVANS.
CRUDE OIL REFINING PROCESS.
APPLICATION FILED DEC. 15, 1919.
1,366,643.
Patented Jan. 25, 1921.
2 SHEETS—SHEET 1.
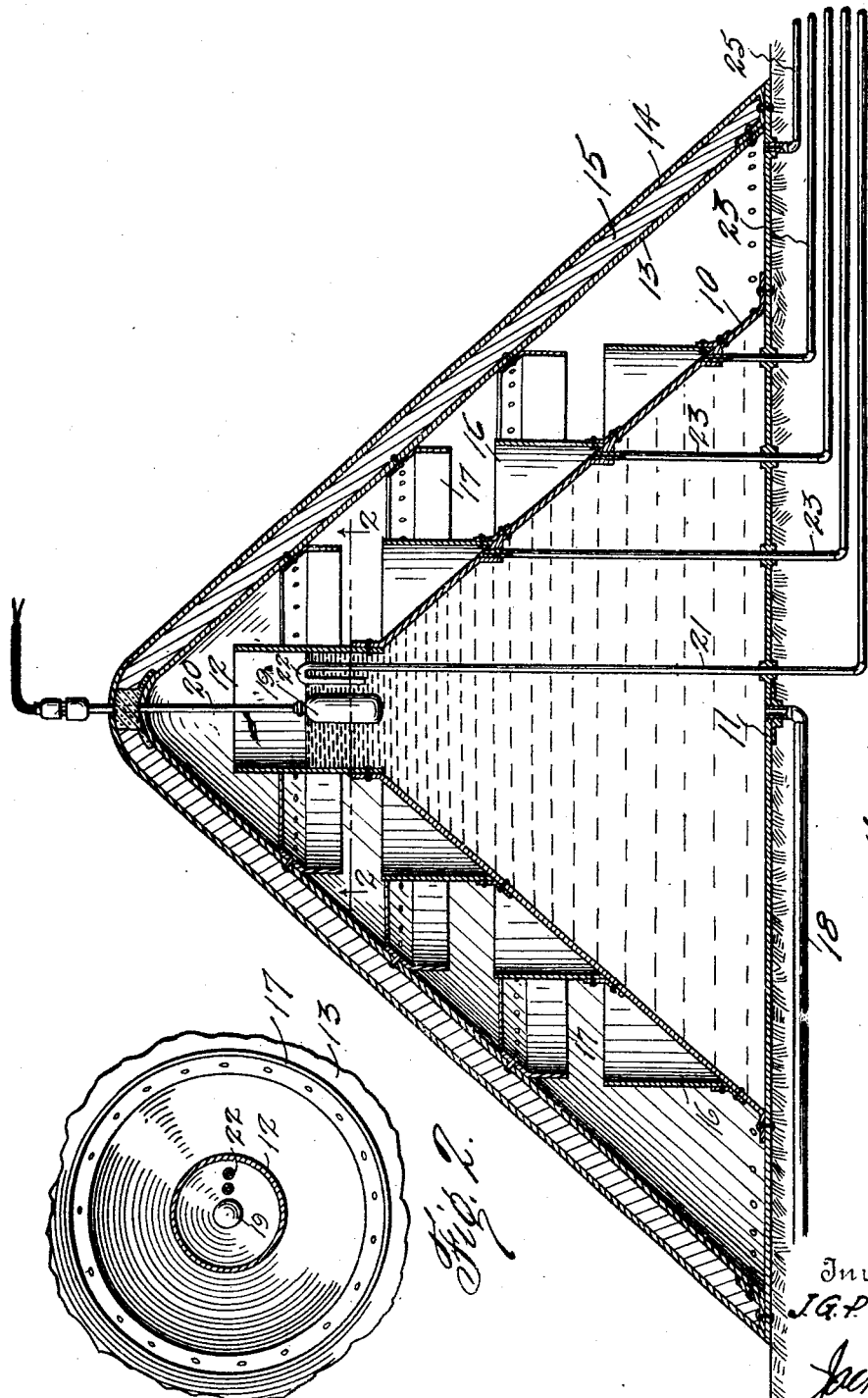

J. G. P. EVANS.
CRUDE OIL REFINING PROCESS.
APPLICATION FILED DEC. 15, 1919.
1,366,643.
Patented Jan. 25, 1921.
2 SHEETS—SHEET 2.
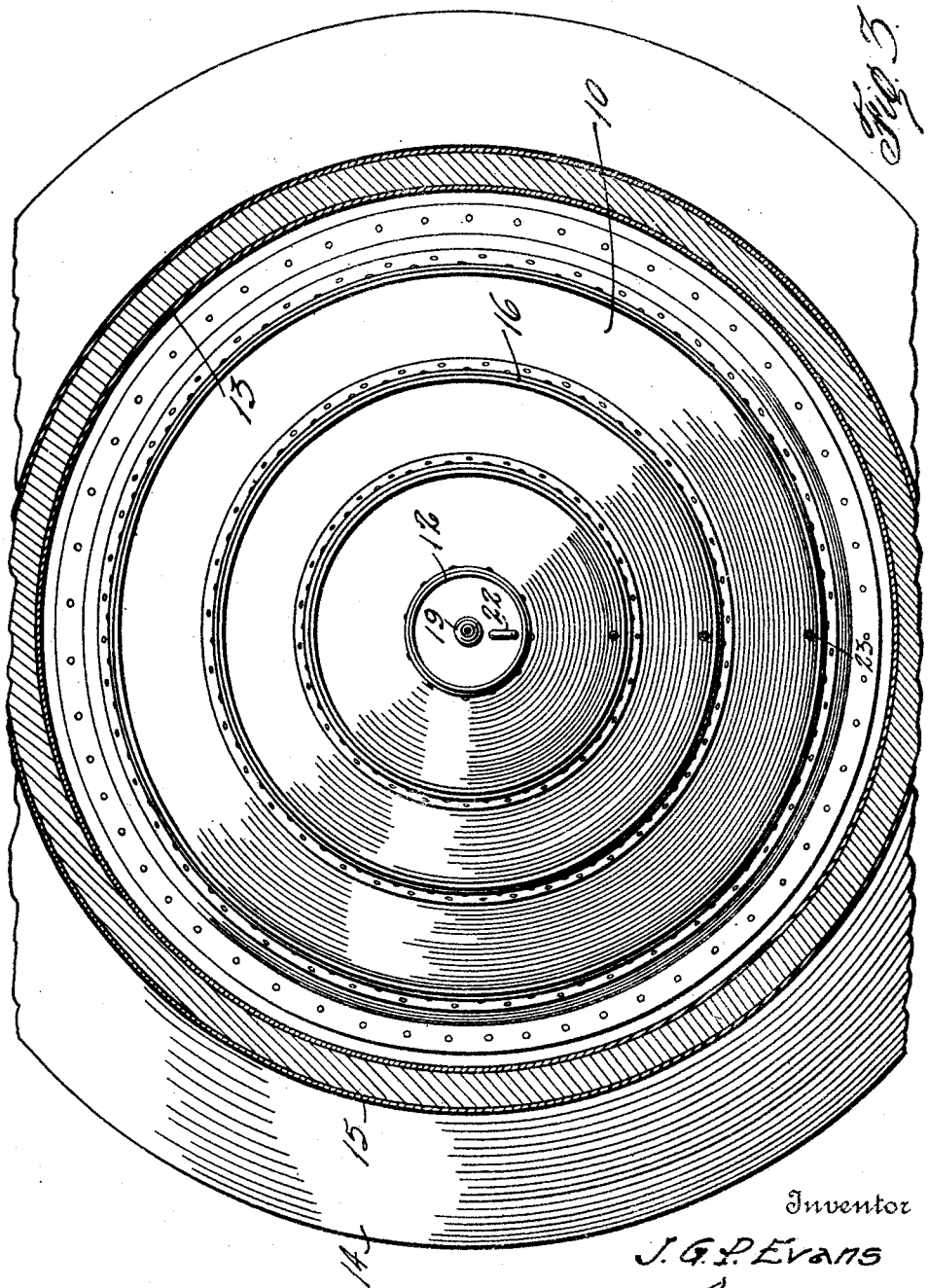
Inventor
J. G. P. Evans
By Jack H. Ohley
Attorney

UNITED STATES PATENT OFFICE.

JEWETT G. P. EVANS, OF HANDLEY, TEXAS.

CRUDE-OIL-REFINING PROCESS.

1,366,643.  Specification of Letters Patent.  Patented Jan. 25, 1921.

Application filed December 15, 1919. Serial No. 344,775.

*To all whom it may concern:*

Be it known that I, JEWETT G. P. EVANS, a citizen of the United States, residing at Handley, in the county of Tarrant and State of Texas, have invented certain new and useful Improvements in Crude-Oil-Refining Processes, of which the following is a specification.

This invention has to do with improvements in crude oil refining processes and apparatuses.

The object of the invention is to refine crude oil in a simple and inexpensive manner and to take off the refined products at a very low cost; at the same time obtaining refined products of a high grade and which are commercially superior to those products obtained from the stills now in common use and which latter products require further treatment after being taken from the still.

The theory involved in this invention is that of applying heat of a high degree at the top of a body of fluid, such as crude oil, and heating the liquid from top to bottom by contact or transmission, whereby the liquid is vaporized at different elevations in the body, according to its susceptibility. By this method the vapors of lesser degree of heat will rise through the liquid and vapors of higher degrees of heat, thus being superheated and expanded. It will be appreciated that where heat is applied to the bottom of a body of liquid there is a partial condensation at the top due to circulation. With my process there can be no circulation as the hottest fluids are uppermost and cannot descend. In view of these facts there can be no redistillation or second distillation which results in higher end points and by my process high gravity gasolene can be had with low temperature end points; such products being better adapted for blending with low gravity distillates, and making for more flexible blending. The process includes condensing the high degree vapors and superheated vapors in a condensing lane according to their specific gravity; whereby the condensed liquids or products may be taken from the still and further refining made unnecessary.

In carrying out this particular process I have evolved an apparatus which includes a truncated conical liquid vat open at its upper end and surrounded by a correspondingly shaped jacket of larger dimension, whereby a condensing lane or space is provided around the vat. Collecting troughs are disposed at different elevations in the lane and discharge pipes lead from the troughs. Liquid heating means is provided at the top of the vat.

The invention will be more readily understood from a reading of the following specification and by reference to the accompanying drawings, in which an example of the invention is shown, and wherein:

Figure 1 is a vertical sectional view of an apparatus for carrying out my process, Fig. 2 is a cross-sectional view on the line 2—2 of Fig. 1, and looking in the direction of the arrows; and Fig. 3 is a view showing the vat in plan and the jacket in cross-section.

In the drawings the numeral 10 designates a truncated conical vat mounted on a circular base 11 and having a cylindrical flue 12 at its top. The base extends beyond the base of the vat and receives the lower end of a conical jacket which jacket preferably includes an inner shell 13 and an outer shell 14 between which heat insulating material 15 is interposed. The shells are preferably made of sheet metal. The space between the vat and the inner shell constitutes a condensing lane.

Collecting troughs 16 are disposed around the outer side of the vat at different elevations. Over each trough annular drip flanges 17 depend from the inner shell. Condensation collecting on the shell 13 will run down the same and drip from the first flange encountered.

One advantage of this still is that the base 11 may rest directly on the ground and no supporting structure is required. A supply pipe 18 enters the vat at the center of its bottom through the base plate. The liquid is supplied at the bottom of the vat and heated at the top. Any suitable heating means may be employed and I have illustrated an immersible electric heater 19 supported on the lower end of a pipe 20 depending through the top of the jacket. The heater is positioned in the lower end of the flue 12 and is kept just under the top of the body of liquid by an overflow pipe 21 having a goose neck 22 at its upper end. The overflow pipe extends down through the base plate and leads to a suitable point of discharge. Discharge pipes 23 communicate with the troughs through the vat and pass down through the body of liquid and out through the base 11 to a suitable point of discharge.

In refining crude oil the latter is supplied to the vat at normal temperature of about 60 degrees. Satisfactory results have been had with a temperature of 560 degrees at the oil level in the flue 12. It will be seen that with a temperature of 560 Fahrenheit at the top, the oil will have a gradually reducing temperature downward until the normal degree is reached and thus the elements of crude oil which are susceptible of vaporizing between these extreme degrees, will vaporize at their proper elevation which vapor will pass upward through the heavier elements and vapors of higher degrees, thereby being superheated and expanded.

It will be seen that the vapors will rise from the body of oil and pass out of the flue into the condensing lane which being at a lower temperature will cause a condensation of said vapors. The vapors will condense as they setttle in the lane in the exact order in which they were formed. Thus the vapors having the highest degree of vaporization will likewise condense at the highest elevation and collect in the uppermost trough 16; while the vapors having the lower degrees of vaporization will collect in the bottom trough and the lowest degree vapors will settle on the base 11 from which a discharge pipe 25 leads. The condensate taken off through the pipe 25 will be high grade gasolene which will come off "sweet" and not require further treatment. It is pointed out that any vapors condensing on the inner shell 13 instead of running down and mixing with lower degree condensates, will encounter a drip flange and fall into their proper trough.

One of the advantages of this process is that the heat radiated from vapors condensing in the condensing lane is reclaimed by the crude liquid in the still, and in so far as all condensate pipes as well as overflow or residuum pipe make exit through bottom of still, all said liquids leaving the still are robbed of their excess heat, and upon final exit are substantially normal in temperature.

What I claim, is:

1. The herein-described process of refining liquids, which consists in holding a body of liquid to be distilled in a tapered mass increasing in cross sectional area downwardly, vaporizing the liquid by subjecting the upper portion of the tapered liquid mass to a higher degree of heat than the lower portion thereof, passing the vapors thus obtained downwardly below the level of the liquid mass in proximity to the same to effect a heat exchange between the vapors and liquid, condensing portions of the vapors at different vertical points in proximity to the liquid mass by the heat exchange, and separately collecting and withdrawing the condensed vapors at the different vertical points.

2. The herein-described process of refining liquids, which consists in holding a body of liquid to be distilled in a tapered mass increasing in cross sectional area downwardly, vaporizing the liquid by subjecting the upper portion of the tapered liquid mass to a higher degree of heat than the lower portion thereof, effecting the upward travel of the liquid within said mass by introducing the liquid into the lower portion thereof and withdrawing the same from the upper portion of the same, passing the vapors thus obtained downwardly below the level of the liquid mass in proximity to the same to effect a heat exchange between the vapors and liquid, condensing portions of the vapors at different vertical points in proximity to the liquid mass by the heat exchange, and separately collecting and withdrawing the condensed vapors at the different vertical points.

3. The herein-described process of refining liquids, which consists in holding a body of liquid to be distilled in a conical mass increasing in diameter downwardly, vaporizing the liquid by subjecting the upper portion of the conical mass to a higher degree of heat than the lower portion thereof, effecting an upward travel of the liquid within the conical mass, by introducing the liquid into one end of the mass and withdrawing it from the opposite end thereof, passing the vapors obtained from the heating action downwardly below the level of the liquid mass to surround the same in proximity thereto for effecting a heat exchange between the vapors and liquid, condensing portions of the vapor at different levels in proximity to the liquid mass by the heat exchange, and separately collecting and withdrawing the condensed vapors at the different levels.

4. The herein-described process of refining liquids, which consists in holding a body of liquid to be distilled in an upstanding mass, vaporizing liquid by subjecting the upper portion of the liquid mass to the action of a higher degree of heat than the lower portion of the same, passing the vapors obtained from the heating action downwardly below the level of the liquid mass in proximity thereto for effecting a heat exchange between the vapors and liquid mass, condensing portions of the vapors at different levels in proximity to the liquid mass by the heat exchange, and separately collecting and withdrawing the condensed vapors at the different levels.

5. The herein-described process of refining liquids, which consists in holding a body of liquid to be distilled in an upstanding mass, vaporizing the liquid by subjecting the upper portion of the upstanding mass to the action of a higher degree of heat than the lower portion of the same, effecting a longitudinal circulation of the liquid within the upstanding mass by introducing the same into one end of the mass and withdrawing the liquid from the opposite end, passing the vapors obtained from the heating action into an insulated passage which surrounds the upstanding mass below its level, causing the vapors thus introduced into the passage to travel downwardly therein for effecting a heat exchange between the vapors and liquid, condensing portions of the vapor at different levels within the passage by the heat exchange, and separately collecting and withdrawing the condensed vapors at the different levels.

In testimony whereof I affix my signature.

JEWETT G. P. EVANS.